US012632939B2

(12) United States Patent
Sasaki

(10) Patent No.: US 12,632,939 B2
(45) Date of Patent: May 19, 2026

(54) APPARATUS, METHOD, AND NON-TRANSITORY COMPUTER-READABLE STORAGE MEDIUM

(71) Applicant: CANON KABUSHIKI KAISHA, Tokyo (JP)

(72) Inventor: Takashi Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 18/490,266

(22) Filed: Oct. 19, 2023

(65) Prior Publication Data

US 2024/0144449 A1 May 2, 2024

(30) Foreign Application Priority Data

Oct. 27, 2022 (JP) ................................. 2022-172597

(51) Int. Cl.
| | |
|---|---|
| *G06T 5/73* | (2024.01) |
| *G06T 5/70* | (2024.01) |
| *G06T 7/11* | (2017.01) |
| *G06T 7/13* | (2017.01) |
| *G06T 7/20* | (2017.01) |
| *G06T 7/70* | (2017.01) |
| *G06T 7/40* | (2017.01) |

(52) U.S. Cl.
CPC ................. *G06T 5/73* (2024.01); *G06T 5/70* (2024.01); *G06T 7/11* (2017.01); *G06T 7/13* (2017.01); *G06T 7/20* (2013.01); *G06T 7/70* (2017.01); *G06T 2207/10024* (2013.01); *G06T 2207/30201* (2013.01)

(58) Field of Classification Search
CPC . G06T 2207/10024; G06T 2207/30201; G06T 5/70; G06T 5/73; G06T 7/11; G06T 7/13; G06T 7/20; G06T 7/70
See application file for complete search history.

(56) References Cited

U.S. PATENT DOCUMENTS

| | | | | |
|---|---|---|---|---|
| 2006/0204055 A1* | 9/2006 | Steinberg | ............... | H04N 23/61 |
| | | | | 382/103 |
| 2007/0258707 A1* | 11/2007 | Raskar | ............... | H04N 23/6812 |
| | | | | 348/E5.037 |
| 2010/0231732 A1* | 9/2010 | Baxansky | .......... | H04N 23/6811 |
| | | | | 348/208.4 |
| 2013/0177260 A1* | 7/2013 | Fujii | ......................... | G06T 5/73 |
| | | | | 382/309 |
| 2013/0336597 A1* | 12/2013 | Maeda | ..................... | G06T 5/73 |
| | | | | 382/275 |
| 2014/0003734 A1* | 1/2014 | Umansky | .................. | G06T 5/73 |
| | | | | 382/275 |

(Continued)

FOREIGN PATENT DOCUMENTS

| | | |
|---|---|---|
| JP | 2002077711 A | 3/2002 |
| JP | 2007306548 A | 11/2007 |

*Primary Examiner* — Hadi Akhavannik

(74) *Attorney, Agent, or Firm* — Canon U.S.A., Inc. IP Division

(57) ABSTRACT

An apparatus includes a determination unit configured to determine a specific region in an image, and a point spread function estimation unit configured to perform point spread function estimation for the specific region. The point spread function estimation unit is capable of performing at least one of edge extraction and mask processing on the image, and is configured to estimate a point spread function for the processed image.

15 Claims, 11 Drawing Sheets

(56) References Cited

U.S. PATENT DOCUMENTS

| | | | |
|---|---|---|---|
| 2016/0148054 A1* | 5/2016 | Han | G06T 7/269 |
| | | | 382/103 |
| 2019/0107688 A1* | 4/2019 | Nakajima | H04N 23/6812 |
| 2019/0157470 A1* | 5/2019 | Send | G01S 17/46 |
| 2021/0097650 A1* | 4/2021 | Kobayashi | G06T 5/70 |
| 2023/0394353 A1* | 12/2023 | Beaurepaire | G08G 1/0129 |

* cited by examiner

FIG. 5A
FIG. 5B
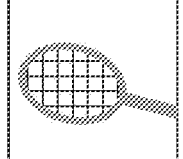
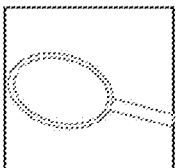

FIG. 9

APPARATUS, METHOD, AND NON-TRANSITORY COMPUTER-READABLE STORAGE MEDIUM

BACKGROUND

Technical Field

The aspect of the embodiments relates to a technology for adding a blurring effect or a deblurring effect to an image.

Description of the Related Art

Hitherto, a technology for estimating a point spread function (PSF) that represents the blur or bokeh characteristics of a subject included in an image and adding a blurring effect or a deblurring effect to the image on the basis of the estimated PSF has been known. For example, Japanese Patent Laid-Open No. 2007-306548 discloses a method for reducing (deblurring) image blur included in a captured image by specifying a specific region in the captured image, calculating a PSF with reference to the image of the specific region, and deconvolving the obtained PSF.

One feature of PSF estimation is that some subject patterns to be referenced may degrade PSF estimation results. For example, a fine lattice pattern such as the string portion of a tennis racket appears as a shape in estimated characteristics. That is, it means that the characteristics of subject blur are not accurately estimated. In the method described in Japanese Patent Laid-Open No. 2007-306548, using such an incorrect PSF to perform correction processing may result in degradation of image quality.

SUMMARY

An apparatus includes a determination unit configured to determine a specific region in an image, and a point spread function estimation unit configured to perform point spread function estimation for the specific region. The point spread function estimation unit is capable of performing at least one of edge extraction and mask processing on the image, and is configured to estimate a point spread function for the processed image.

Further features of the disclosure will become apparent from the following description of exemplary embodiments with reference to the attached drawings.

BRIEF DESCRIPTION OF THE DRAWINGS

FIG. 1 is a diagram for describing the configuration of a digital camera according to a first embodiment.

FIG. 2 is a diagram for describing the configuration of an image processing unit according to the first embodiment.

FIGS. 5A and 5B are diagrams for describing a PSF estimation target region in the first embodiment.

FIG. 9 is a diagram for describing the configuration of an image processing unit according to a second embodiment.

DESCRIPTION OF THE EMBODIMENTS

First Embodiment

Figure 3:
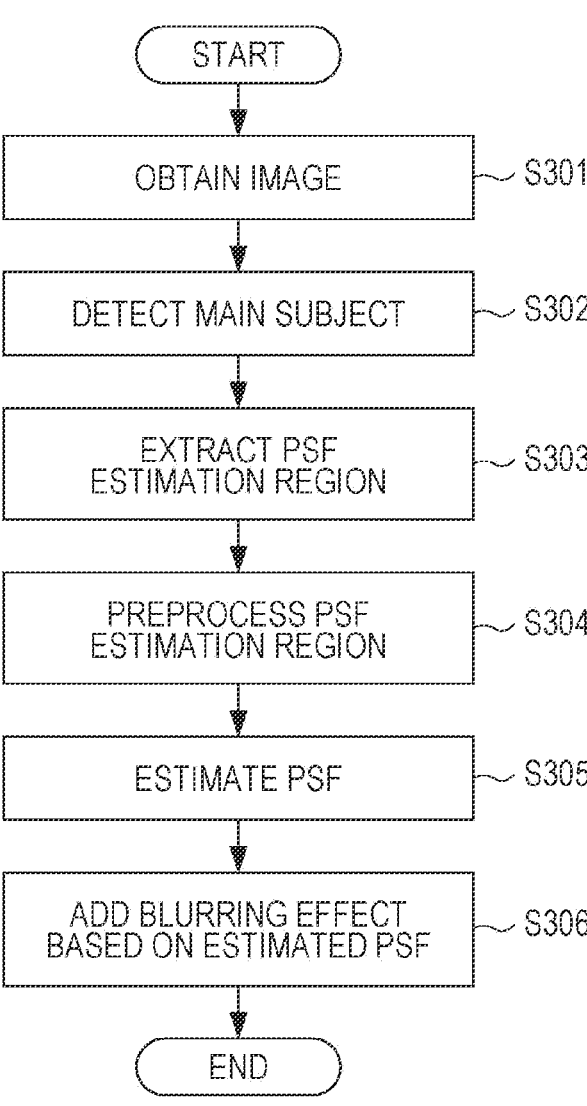
FIG. 3 is a flowchart for describing the operation of the image processing unit according to the first embodiment.

In the following, an embodiment of the present disclosure will be described in detail with reference to the drawings. An embodiment to be described below is an image capturing apparatus. As an example of the image capturing apparatus, an example in which the present disclosure is applied to a digital camera is described. Note that the present disclosure relates to correction processing to be applied to captured images and more specifically relates to a method in which an image signal is corrected in order to be used in estimation, a PSF is estimated, and a blurring effect or a deblurring effect is added to a specific region of the image on the basis of the estimated PSF. Thus, configurations for image capturing and recording are not essential in the image capturing apparatus. Moreover, in the present embodiment, "bokeh" includes out-of-focus blur due to image defocusing, and "blur" includes camera shake and subject motion blur, for example; however, "bokeh" and "blur" are not limited thereto.

Figure 1:
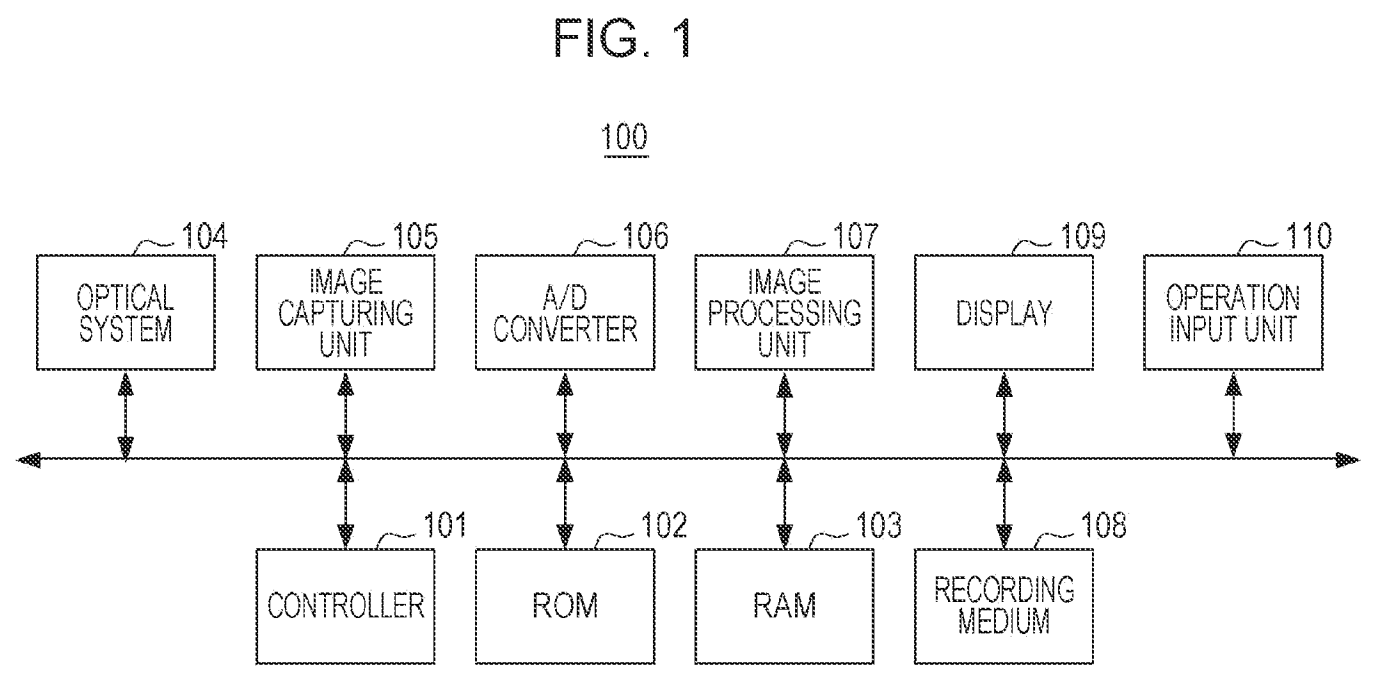

FIG. 1 is a block diagram illustrating a functional configuration of a digital camera according to an embodiment of the present disclosure.

A controller 101 is, for example, a central processing unit (CPU). The controller 101 controls operations of individual blocks of a digital camera 100 by reading out operation programs for the individual blocks of the digital camera 100 from a read-only memory (ROM) 102, loading the operation programs into a random-access memory (RAM) 103, and executing the loaded operation programs.

The ROM 102 is a rewritable non-volatile memory and stores, for example, parameters necessary for operating the individual blocks in addition to the operation programs for the individual blocks of the digital camera 100. The RAM 103 is a rewritable volatile memory and is used as a temporary storage area for data output in the operation of each block of the digital camera 100.

An optical system 104 forms a subject image on an image capturing unit 105. The optical system 104 includes, for example, a fixed lens, a zoom lens that changes the focal length, and a focus lens that adjusts the focus. The optical system 104 also includes an iris and controls the amount of light at the time of image capturing by adjusting an aperture diameter of the optical system using the iris.

The image capturing unit 105 is, for example, an image sensing device such as a charge-coupled device (CCD) or a complementary metal-oxide semiconductor (CMOS) sensor. The image capturing unit 105 photoelectrically converts an optical image formed on the image sensing device by the optical system 104 and outputs the obtained analog image signal to an analog-to-digital (A/D) converter 106. The A/D converter 106 performs A/D conversion processing on the analog image signal input thereto, and outputs the obtained digital image data to the RAM 103, so that the RAM 103 stores the digital image data.

An image processing unit 107 performs various types of image processing, such as white balance adjustment, color interpolation, and gamma processing, on the image data stored in the RAM 103 and outputs the resulting image data to the RAM 103. Moreover, the image processing unit 107 performs processing on captured images or on the image data stored in the RAM 103 in order to add a blurring effect or a deblurring effect.

A recording medium 108 is a detachable memory card or the like. In the recording medium 108, images processed by the image processing unit 107 and stored in the RAM 103 and images converted from analog to digital by the A/D converter 106 are recorded as recorded images.

A display 109 is a display device such as a liquid crystal display (LCD). The display 109 displays various types of information in the digital camera 100. For example, the display 109 realizes an electronic viewfinder function by displaying, in a live view manner, a subject image captured by the image capturing unit 105, and plays back and displays an image recorded in the recording medium 108.

An operation input unit 110 includes a user input interface and outputs, to the controller 101, a control signal corresponding to an operation input performed by the user upon detection of the operation input. Examples of the user input interface include a release switch, a setting button, and a mode setting dial. In an embodiment in which the display 109 has a touch panel sensor, the operation input unit 110 also functions as an interface configured to detect a touch operation performed on the display 109.

The configuration and basic operation of the digital camera 100 are described above.

Next, the operation of the image processing unit 107, which is a characteristic of the first embodiment according to the present disclosure, will be described in detail. In the present embodiment, it is intended to capture an image of a subject performing a tennis swing. In general, when capturing images of a subject playing tennis, golf, baseball batting, and other sports that involve swinging a hand-held racket, club, or bat (hereinafter referred to as swing sports), in one embodiment, there is no blur or bokeh on images of the playing subject's face. In contrast, if the swinging regions of the racket and arms are blurred in the swinging direction in an image, the image is more dynamic and conveys the intensity of the play more impressively to the viewer, resulting in a favorable image. In the present embodiment, a method will be described in which a PSF for a swinging region is estimated with high accuracy, and a blurring effect is added on the basis of the estimated PSF.

Figure 2:
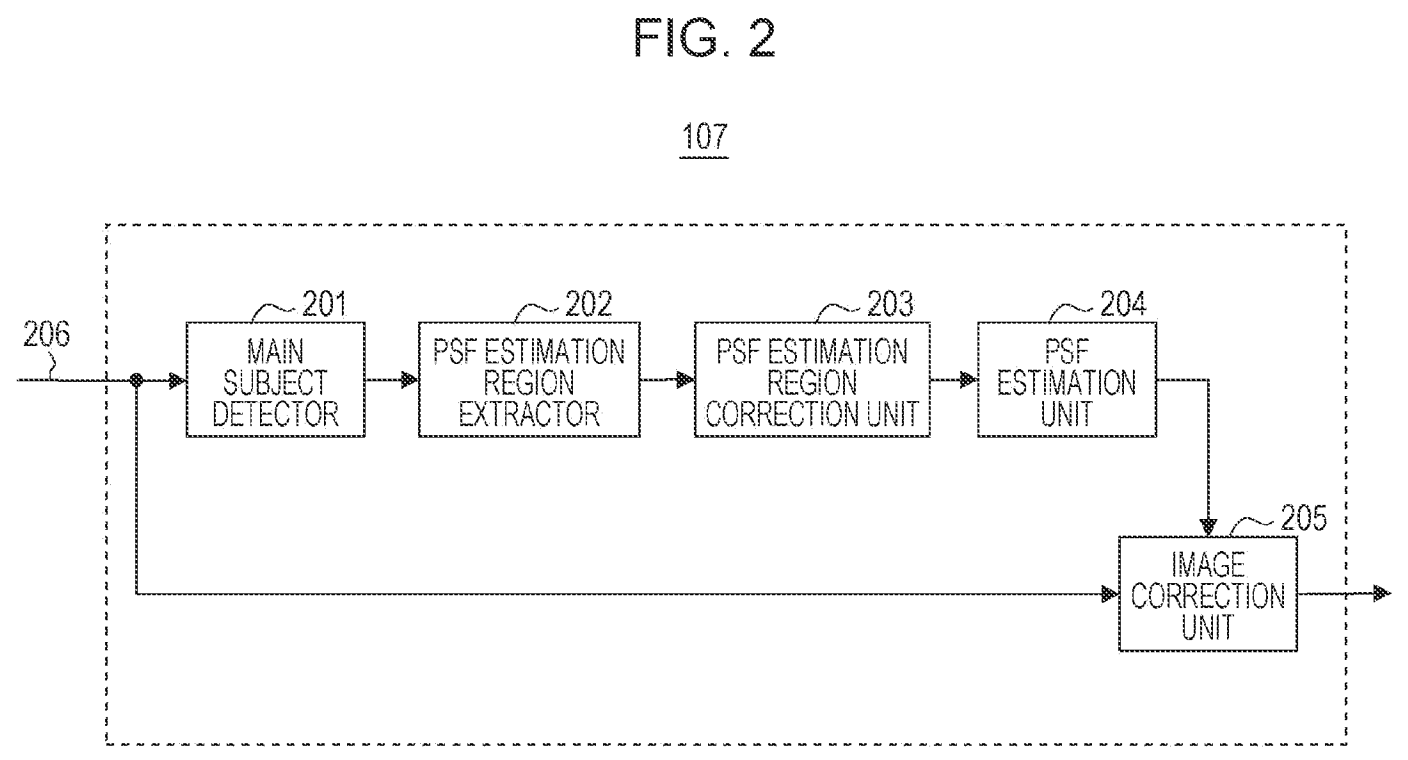

Blurring effect addition processing performed by the image processing unit 107 will be described with reference to FIGS. 2 and 3. FIG. 2 is a block diagram of the image processing unit 107. FIG. 3 is a flowchart of processing performed by the image processing unit 107. The blurring effect addition processing may be performed on images captured in a state in which execution of the processing is commanded or on images that have already been recorded in, for example, the recording medium 108 and for which execution of the processing is commanded from a menu screen or the like.

As illustrated in FIG. 2, the image processing unit 107 includes a main subject detector 201, a PSF estimation region extractor 202, a PSF estimation region correction unit 203, a PSF estimation unit 204, and an image correction unit 205. Functions of each unit of the image processing unit 107 are executed under the command of the controller 101.

Figure 4:
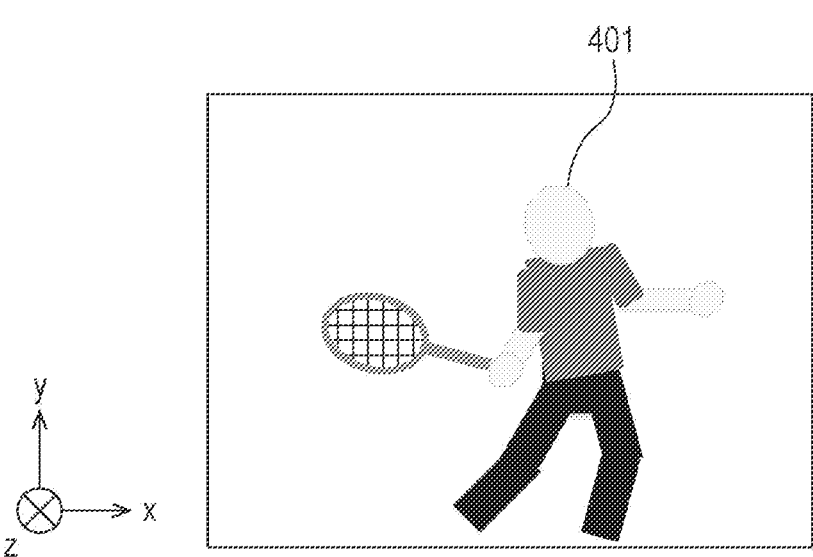
FIG. 4 is a diagram for describing a captured image in the first embodiment.

Next, in S301 of FIG. 3, the image capturing unit 105 captures an image of a subject. When an analog image signal is obtained through image capturing, the A/D converter 106 converts the analog image signal from analog to digital and stores the resulting digital data in the RAM 103. The controller 101 sends the digital data as image data 206 to the image processing unit 107. An example of captured image data is illustrated in FIG. 4. FIG. 4 illustrates a captured image of a human subject 401 performing a tennis swing. The exposure time is 1/500 sec, and there is no blur on the face. Suppose that the swinging racket has motion blur. Moreover, suppose that the size of the image is 1024×680 pixels, and the size of one pixel is 5 μm. Note that tennis is described as an example of a sport that involves a swinging motion in the present embodiment; however, the present embodiment can also be applied to other sports. Specifically, examples of the sports include golf, badminton, table tennis, baseball, lacrosse, hockey, fencing, kendo, canoeing, and rowing. By performing processing for adding a blurring effect such that motion blur occurs in the region of a swinging object (athletic equipment) in each sport, a dynamic sports image can be obtained.

In S302, the main subject detector 201 performs an operation for detecting a main subject in the image data 206 captured in S301. In this case, the main subject detector 201 detects the human subject 401. It is sufficient that existing techniques be used as a method for detecting the human subject 401 as the main subject. For example, it is sufficient that a method as disclosed in Japanese Patent Laid-Open No. 2002-77711 be used.

In S303, the PSF estimation region extractor 202 extracts a region including a swinging object (the tennis racket) in the human subject 401 detected by the main subject detector 201. It is sufficient that existing techniques be used as a method for extracting the region of the tennis racket. As in the case of the main subject in S302, the region can be extracted using a method as disclosed in Japanese Patent Laid-Open No. 2002-77711. Alternatively, the user may be caused to specify a PSF estimation region through the operation input unit 110. In the present embodiment, the size of the PSF estimation region is a square region having 256×256 pixels. The extracted region is illustrated in FIG. 5A. In FIG. 5A, the region including the swinging object (the tennis racket) is extracted as a PSF estimation target region from the image illustrated in FIG. 4.

In S304, the PSF estimation region correction unit 203 applies a filter for extracting edges to the region extracted by the PSF estimation region extractor 202. In this processing step, the string portion of the tennis racket is excluded, which degrades a PSF estimation result. Specifically, high-frequency components included in the PSF estimation region are excluded, and a bandpass filter that enables edge extraction is applied.

Figure 6:
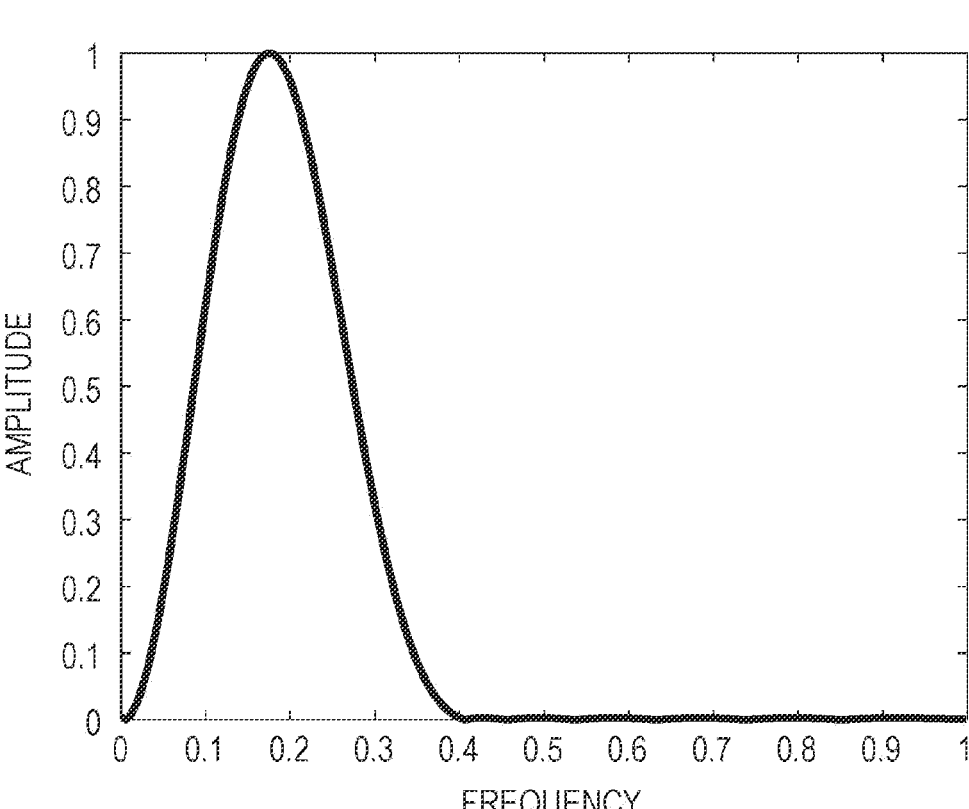
FIG. 6 is a diagram for describing characteristics of a filter to be applied to the PSF estimation target region in the first embodiment.

An example of characteristics of the bandpass filter is illustrated in FIG. 6. In FIG. 6, the horizontal axis represents frequency, and "1" corresponds to the Nyquist frequency. The cut-off frequency is set with reference to the size of the PSF estimation region. In the present embodiment, fine subjects that are repeated in 5-pixel cycles, which are about 2% of the size of the PSF estimation region, are cut off when the fine subjects pass through the bandpass filter. The PSF estimation region after being subjected to edge extraction is illustrated in FIG. 5B. Note that the subject pattern that degrades the accuracy of PSF estimation is excluded by controlling the extraction bandwidth for the case where edge extraction is performed in the present embodiment; however, the present embodiment is not limited to this method. For example, edge-edge distances may be calculated from signals subjected to an edge extraction filter such as a Sobel filter, and masking processing may be performed to lower signal values in regions where the edge-edge distances are short, such as the string portion of the tennis racket. Alternatively, a method may be used in which mask processing is performed on signals corresponding to the string portion so as to cause the signal values of the string portion to become 0 (luminance signals are 0) before edge extraction processing is performed, and edges are extracted from the signals subjected to the mask processing. Either method can be used to exclude in advance the subject pattern that degrades a PSF estimation result and improve the accuracy of subsequent PSF estimation.

In S305, the PSF estimation unit 204 estimates a PSF using the signal output from the PSF estimation region correction unit 203. Existing techniques can be used to estimate the PSF. As an example, the following is an overview of PSF estimation using an iterative method.

In a case where an image signal of a PSF estimation region is denoted by B, the PSF to be estimated is denoted by K, and an image (latent image) without blur or bokeh in the PSF estimation region is denoted by L, when noise in the image is ignored, the relationship expressed by the following Eq. (1) holds.

$$B = \mathrm{Conv}(K, L) \tag{1}$$

In Eq. (1), Cony represents a convolution operation. Eq. (1) cannot be solved analytically because both K and L are unknowns. Thus, the following estimation is performed.

First, the latent image L is set to have an appropriate initial value. An image obtained by performing edge extraction processing on a captured image can be used as the initial value of the latent image L.

Subsequently, in an energy function E(K) expressed by the following Eq. (2), where L is held constant and K is an unknown parameter, K that minimizes the energy function E(K) is calculated.

$$E(K) = \mathrm{argmin}_K \left( \|B - \mathrm{Conv}(K, L)\|^2 + \sigma_K^2 \right) \tag{2}$$

In Eq. (2), σ represents the regularization term, which is an L2 norm that takes the sum of squares of each element of the PSF in this case.

Subsequently, in an energy function E(L) expressed by the following Eq. (3), where K is held constant and L is an unknown parameter, L that minimizes the energy function E(L) is calculated using the calculated K.

$$E(L) = \mathrm{argmin}_L \left( \|B - \mathrm{Conv}(K, L)\|^2 + \sigma_L^2 \right) \tag{3}$$

K that minimizes the energy function E(K) is calculated using the calculated L, and then L that minimizes the energy function E(L) is calculated using the calculated K. This processing is iteratively performed until the calculated K converges to a constant value, so that the PSF is estimated. The description above is the overview of PSF estimation using the iterative method.

Figure 7A:
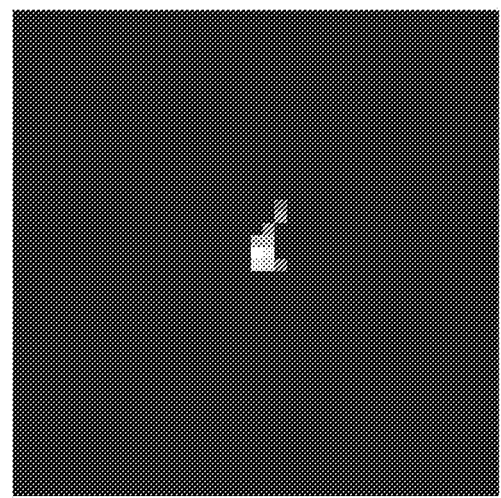
FIGS. 7A and 7B are diagrams for describing PSF estimation results in the first embodiment.
Figure 7B:
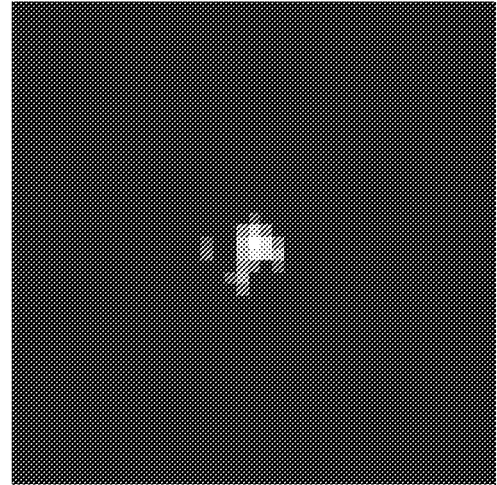

FIG. 7A illustrates a result (a kernel) obtained by performing PSF estimation using the signal output by the PSF estimation region correction unit 203 illustrated in FIG. 5B. In FIG. 7A, the direction of the tail represents the direction of blur, the length of the tail represents the amount of blur, and shades of black and white represent the intensity of blur. In contrast, FIG. 7B illustrates a result obtained by performing PSF estimation using an existing uncorrected signal. In FIG. 7B, it is clear that the grid pattern of the edges of the spring bed affects the PSF estimation result. In FIG. 7A, the pattern of the subject is not seen, and it is clear that the direction and amount of blur of the racket can be correctly estimated.

In S306, the image correction unit 205 adds a blurring effect to the image data 206 with reference to the signal output by the PSF estimation unit 204. First, a kernel in which blur is emphasized along the direction of the blur is generated with reference to the kernel of FIG. 7A.

Figure 8A:
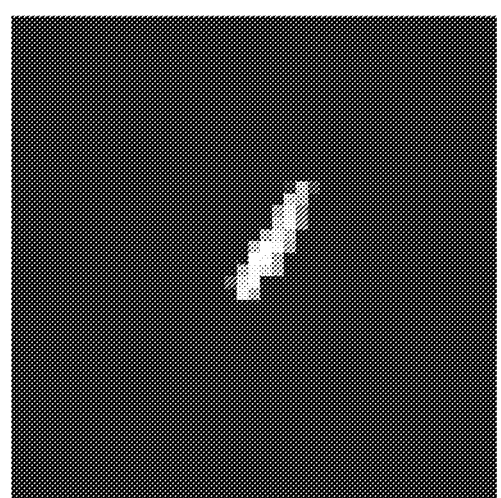
FIGS. 8A and 8B are diagrams for describing an effect of blur addition processing in the first embodiment.
Figure 8B:
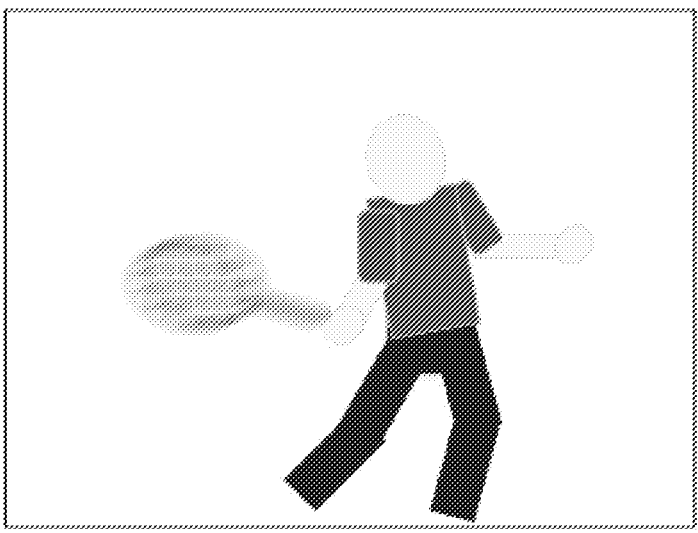

The generated kernel is illustrated in FIG. 8A. Next, a convolution operation is performed, using the kernel in which blur is emphasized, on the corresponding region extracted in S303 from the image data 206 by the PSF estimation region extractor 202 to add a blurring effect. The result obtained by adding the blurring effect is illustrated in FIG. 8B. In FIG. 8B, the face of the playing human subject does not have blur or bokeh. In contrast, the swinging racket region has strong motion blur, resulting in generation of a dynamic image.

Note that in a case where, for example, exposure time is used as a reference and where the exposure time is 1/500 second in this embodiment and is changed to about 1/250 second, it is sufficient that the amount (length) and intensity of blur to be emphasized be doubled in the PSF estimation result. A configuration may also be used in which the size of the athletic equipment in the screen or the distance to the subject divided by the focal length at the time of image capturing is used as a reference, and the amount of blur to be emphasized so as to correspond to the value of the reference is predetermined. Alternatively, a configuration may be used in which the levels of emphasis (low, middle, and high) are preset, and one of the levels of emphasis is selected by the user. By appropriately determining the characteristics of blurring effects to be added in this manner, it is possible to generate suitable images.

Although the present embodiment describes a case where a blurring effect is added to the swinging racket region, it is also possible to add a deblurring effect to a region (for example, a face region) where blur (including bokeh) has occurred. In that case, in S303, the PSF estimation region extractor 202 extracts, as a specific region, a face region of the human subject 401 detected by the main subject detector 201. Then, in S304, the PSF estimation region correction unit 203 detects skin color regions from the region extracted by the PSF estimation region extractor 202 so that only the edges of skin color regions of the extracted region become valid, and performs mask processing for skin color regions on the edge extraction results. In this manner, PSF estimation can be prevented from being degraded by the effects of objects with fine patterns that are present around the face, such as a mesh hat, for example. Next, a PSF is estimated using the signal of the corrected PSF estimation region. Lastly, the image correction unit 205 performs an inverse convolution operation between the face region of the image data 206 and the estimated PSF to add a deblurring effect. The inverse convolution operation is expressed by the following Eq. (4).

$$L = F^{-1}\left(\frac{F(B)}{F(K)}\right) \tag{4}$$

In Eq. (4), F denotes the Fourier transform, and $F^{-1}$ denotes the inverse Fourier transform.

In the present embodiment, the size of the PSF estimation region is a square region having 256×256 pixels; however, the size of the PSF estimation region is not limited to this and may be a region other than a square region. For example, in a case where a swinging object is an elongated object like a baseball bat, in one embodiment, the PSF estimation region is also rectangular. When the PSF estimation region has such a shape, it is more likely to prevent another subject present in the background from being included in the PSF estimation region, so that the accuracy of PSF estimation for the swinging object improves. In that case, the corresponding rectangular region is divided into a plurality of squares, a PSF is estimated for each square, and a PSF estimation result can be calculated for the original rectangle by adding up the PSFs in frequency space. Specifically, in a case where the rectangle is divided into n regions, a value (F(K_all)) of the PSF estimation result of the rectangle in frequency space is expressed by the following Eq. (5).

$$F(K\_all) = \sum_{i=0}^{n} F(K_n) \qquad (5)$$

Moreover, in a case where a PSF is not estimated for every region obtained as a result of division due to, for example, the load involved in computing, the priority levels of division regions to be used for PSF estimation can be determined with reference to the edge extraction result.

Specifically, the more widely varied the angles of the edges in a region are, the more stable the PSF estimation result becomes. Thus, in one embodiment, such regions are referred to in order to perform estimation. For example, in one embodiment, regions including portions of athletic equipment where the logo of the manufacturer or letters are printed are referred to in order to perform estimation.

In addition, in a case where a circular object is input, edges have less imbalance than in the case of a linear object, and a more stable PSF estimation result can be obtained with respect to the direction of blur. Thus, for example, in the case of a golf club, in one embodiment, the regions including portions of the head of the golf club are used to perform estimation than the region of the shaft of the golf club.

Second Embodiment

In the following, a second embodiment of the present disclosure will be described. Note that an embodiment to be described below is an image capturing apparatus similarly to as in the first embodiment and will be described using an example in which the present disclosure is applied to a digital camera as an example of an image capturing apparatus.

In the first embodiment, the accuracy of PSF estimation is improved, which enables acquisition of dynamic images. However, in the present embodiment, high-quality dynamic images are generated in a stable manner by additionally performing scene recognition (scene estimation) using machine learning or deep learning techniques.

Figure 9:
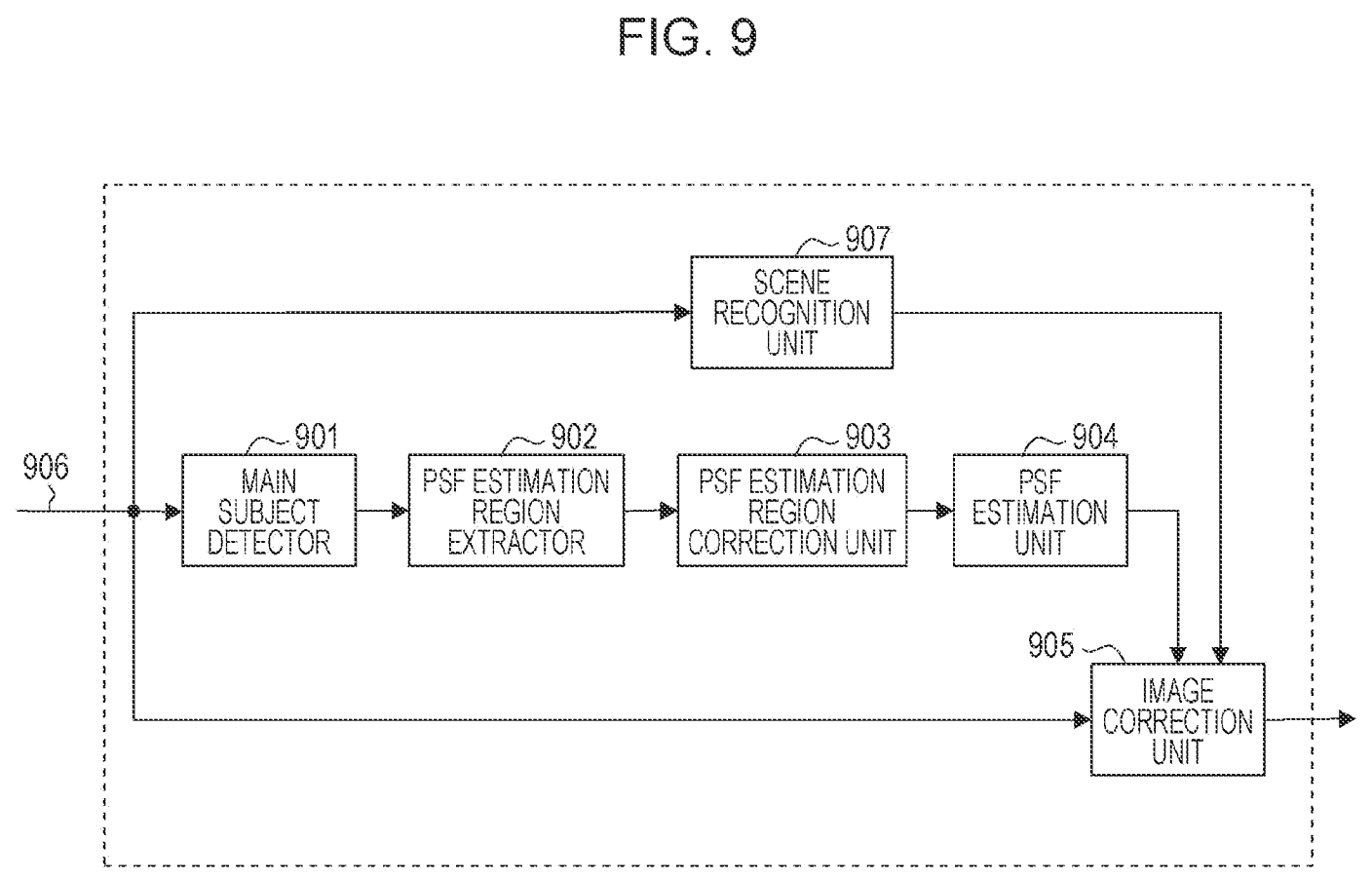

The configuration of the digital camera according to the second embodiment of the present disclosure is substantially the same as the block diagram in FIG. 1 described in the first embodiment, and thus description will be omitted. The present embodiment is different from the first embodiment in that the image processing unit 107 has a configuration as illustrated in FIG. 9. Details will be described below.

In FIG. 9, a main subject detector 901, a PSF estimation region extractor 902, a PSF estimation region correction unit 903, and a PSF estimation unit 904 are the same as those in the first embodiment. An image correction unit 905 is configured to receive image data 906 and outputs from the PSF estimation unit 904 and a scene recognition unit 907. The scene recognition unit 907 corresponds to new processing added to the second embodiment.

Figure 10:
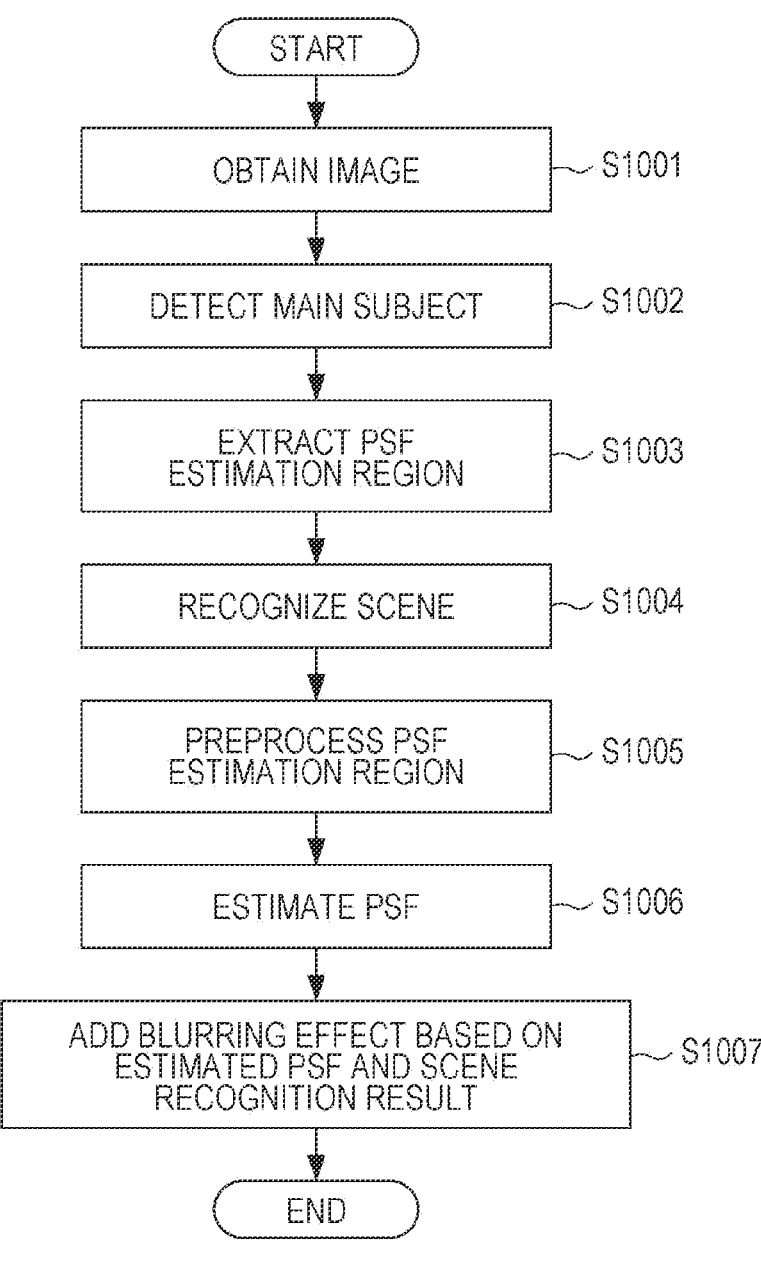
FIG. 10 is a flowchart for describing the operation of the image processing unit according to the second embodiment.

FIG. 10 is a flowchart for processing performed by the image processing unit 107 in the second embodiment. Note that, similarly to as in FIG. 4, it is intended also in the second embodiment to capture an image of a subject performing a tennis swing. Processing from S1001 to S1003 of FIG. 10 is the same as that from S301 to S303 of the first embodiment, and thus description will be omitted.

In S1004, the scene recognition unit 907 recognizes (estimates) a scene represented by the image data 906. In this case, the scene recognition unit 907 recognizes the type of sport. It is sufficient that an existing method be used as a method to recognize what kind of sport is being played. For example, it is sufficient that an existing method as disclosed in (Aki SHIBUTANI, Yoshiaki SUGIYAMA, and Yasuo ARIKI, "Sports Kiji no Jidou Hambetsu to Ruiji Shïn no Kensaku", Information Processing Society of Japan, Proceedings of the 55th National Convention of Information Processing Society of Japan, pp. 65-66 (1997-09)) be used. Subjects playing not only tennis but also sports such as golf or baseball can be recognized.

Furthermore, the scene recognition unit 907 estimates the movement direction of the racket at the time of image capturing from a recognition result of the type of sport, the way in which the digital camera 100 and the human subject 401 face each other, and a position-orientation estimation result of the racket in the image data of the racket region extracted in S1003. Note that, as a method to estimate the position and orientation of the racket, it is sufficient that a method as disclosed in (Ryosuke ARAKI, Kosuke MANO, Takeshi ONISHI, Masanori HIRANO, Tsubasa HIRAKAWA, Takayoshi YAMASHITA, and Hiromitsu FUJIYOSHI, "Gazou Seisei Nettowāku no Gyaku-Dempan ni motozuku Kurikaeshi Koushin ni yoru Buttai Shisei Suitei wo mochiita Buttai Haji", Annual Conference of The Robotics Society of Japan, 2020) be used.

Processing in S1005 is the same as that in S304 of the first embodiment, and thus description will be omitted.

In S1006, the PSF estimation unit 904 estimates a PSF using the signal output from the PSF estimation region correction unit 903. In PSF estimation according to the present embodiment, an evaluation value of the degree of edge imbalance in the input signal is calculated in addition to the processing in the first embodiment. Specifically, the angle of each edge included in the region is calculated, and the angular variance over the entire region is used as the evaluation value of the degree of edge imbalance. The higher the evaluation value, the more edges of various angles exist in the region. The more edges of various angles there are in the estimation region, the more stable the PSF estimation result in the direction of blur becomes. Thus, the higher the evaluation value of the degree of edge imbalance, the more accurate the PSF estimation result is generated. The PSF estimation unit 904 outputs the PSF estimation result and the evaluation value of the degree of edge imbalance to the image correction unit 905.

Figure 11:
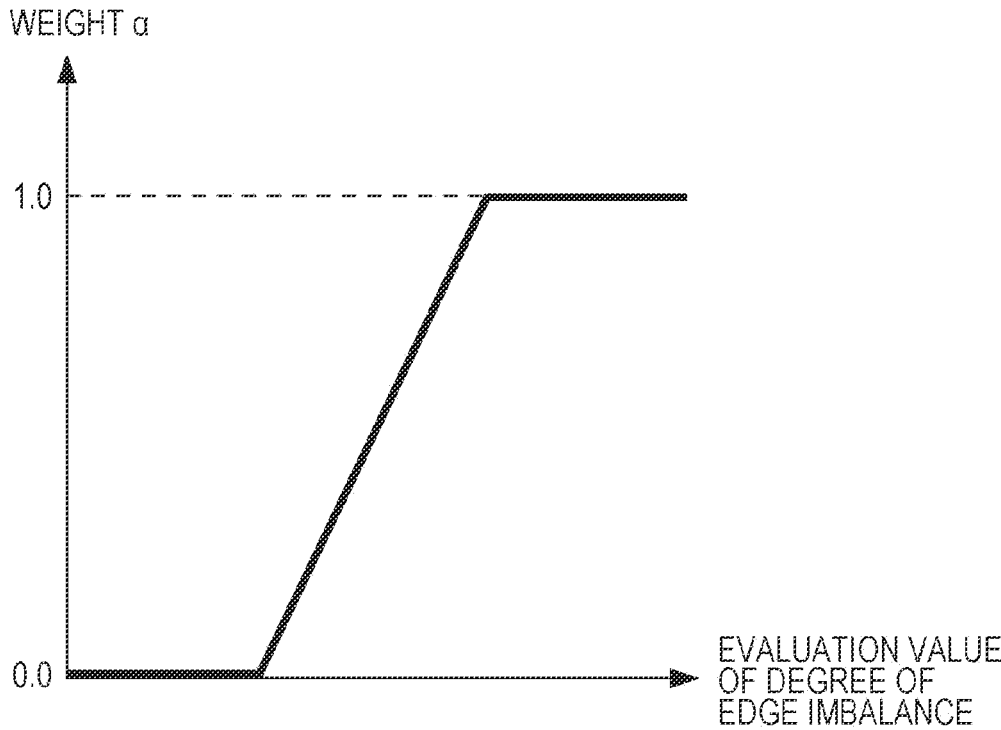
FIG. 11 is a diagram for describing a graph used when conversion into a weight is performed in the second embodiment.

In S1007, the image correction unit 905 refers to the signal output from the PSF estimation unit 904 and the output signal from the scene recognition unit 907 to add a blurring effect to the image data 906. The direction (angle) of blur to be added is obtained by combining the direction estimated through PSF estimation and the direction estimated by the scene recognition unit 907 using a weight generated from the evaluation value of the degree of edge imbalance. FIG. 11 illustrates a graph used when the evaluation value of the degree of edge imbalance is converted into a weight α.

As in FIG. 11, the image correction unit 905 is designed such that the higher the evaluation value of the degree of edge imbalance (the higher the accuracy of PSF estimation), the heavier the weight α. Next, the direction of blur to be added lastly (DIR_BLUR_F) is expressed by the following Eq. (6) when the direction estimated through PSF estimation is denoted by DIR_BLUR_PSF, and the direction estimated by the scene recognition unit 907 is denoted by DIR_BLUR_SCENE.

$$DIR\_BLUR\_F=DIR\_BLUR\_PSF*\alpha+ \\ DIR\_BLUR\_SCENE(1.0-\alpha) \quad (6)$$

A kernel in which blur is emphasized along the calculated direction DIR_BLUR_F is generated.

A method for emphasizing blur and a method for adding blur are the same as those in the first embodiment.

With the configuration as in the present embodiment, even in a case where the edges in the region are imbalanced at some angles, the direction in which a swinging object moves can be estimated by also using machine learning techniques or deep learning techniques in, for example, position-orientation estimation. This allows the direction of blur to be calculated with high accuracy even for, for example, sports equipment with many linear portions, such as a baseball bat, and high-quality, dynamic images can be obtained in a stable manner.

Although some embodiments of the present disclosure have been described above, the present disclosure is not limited to these embodiments, and various modifications and changes are possible within the scope of the gist of the present disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-172597, filed Oct. 27, 2022, which is hereby incorporated by reference herein in its entirety.

What is claimed is:

1. An apparatus comprising:
at least one processor; and a memory coupled to the at least one processor, the memory having instructions that, when executed by the processor, perform operations as:
a determination unit configured to determine a specific region in an image, the specific region being a region of a swinging target object in a sport that involves a swinging motion; and
a point spread function estimation unit configured to perform point spread function estimation for the specific region, wherein
the point spread function estimation unit is capable of performing edge extraction and mask processing on the image, and
is configured to estimate a point spread function for the processed image,
wherein the point spread function estimation unit
(i) performs, for the specific region, mask processing for lowering signal values in regions where the edge-edge distances are shorter than a predetermined value so as to exclude in advance a subject pattern that degrades a point spread function estimation result, and thereafter perform edge extraction on the region; and
(ii) estimate a point spread function for the processed image obtained after the mask processing and the edge extraction.

2. The apparatus according to claim 1, wherein the swinging target object in the sport that involves a swinging motion is athletic equipment for the sport.

3. The apparatus according to claim 1, wherein the point spread function estimation unit is configured to divide an estimation region into a plurality of regions in accordance with the shape of the image and combine results, which are obtained by performing point spread function estimations for the plurality of respective regions, by adding the results in frequency space.

4. The apparatus according to claim 3, wherein the point spread function estimation unit is configured to increase a priority level of each region of the estimation region as an edge direction angular distribution in the region becomes wider, the priority levels being to be combined.

5. The apparatus according to claim 1, further comprising:
a calculating unit configured to add a blurring effect or a deblurring effect to the specific region, wherein
the calculating unit is configured to determine characteristics of blurring or deblurring, based on a result of the point spread function estimation.

6. The apparatus according to claim 5, wherein the characteristics of blurring or deblurring are an amount of blur, a direction of blur, and an intensity of blur in the point spread function estimation.

7. The apparatus according to claim 5, further comprising:
a scene estimation unit configured to estimate a scene in the image, which includes a direction in which the specific region moves, wherein
the calculating unit is configured to determine the characteristics of blurring or deblurring, based on a result of the point spread function estimation and a result of the scene estimation.

8. The apparatus according to claim 7, wherein the scene estimation unit is configured to recognize a type of sport included as the scene in the image, and
estimate a position and an orientation of one or more subjects included in the specific region.

9. The apparatus according to claim 8, wherein the scene estimation unit is configured to estimate a direction in which the specific region moves.

10. The apparatus according to claim 7, wherein the calculating unit is configured to increase a weight for a direction of blur in the point spread function estimation as an edge angular variance in a region where the point spread function estimation is to be performed becomes larger.

11. A method comprising:
determining a specific region in an image, the specific region being a region of a swinging target object in a sport that involves a swinging motion; and
estimating a point spread function in the specific region, wherein
in the estimating, it is possible to perform edge extraction and mask processing on the image, and
a point spread function is estimated for the processed image,
wherein in the estimating,
(i) mask processing, for lowering signal values in regions where the edge-edge distances are shorter than a predetermined value so as to exclude in advance a subject pattern that degrades a point spread function estimation result, is performed and thereafter edge extraction on the region is performed; and (ii) the point spread function is estimated for the processed image obtained after the mask processing and the edge extraction.

12. The method according to claim 11, further comprising dividing an estimation region into a plurality of regions in accordance with the shape of the image and combine results, which are obtained by performing point spread function estimations for the plurality of respective regions, by adding the results in frequency space.

13. A non-transitory computer-readable storage medium storing a program for causing a computer to perform a method, the method comprising:

determining a specific region in an image, the specific region being a region of a swinging target object in a sport that involves a swinging motion; and estimating a point spread function in the specific region, wherein in the estimating, it is possible to perform edge extraction and mask processing on the image, and a point spread function is estimated for the processed image, wherein in the estimating, (i) mask processing, for lowering signal values in regions where the edge-edge distances are shorter than a predetermined value so as to exclude in advance a subject pattern that degrades a point spread function estimation result, is performed and thereafter edge extraction on the region is performed; and (ii) the point spread function is estimated for the processed image obtained after the mask processing and the edge extraction.

14. The non-transitory computer-readable storage medium according to claim 13, further comprising dividing an estimation region into a plurality of regions in accordance with the shape of the image and combine results, which are obtained by performing point spread function estimations for the plurality of respective regions, by adding the results in frequency space.

15. The non-transitory computer-readable storage medium according to claim 13, wherein in a case where the specific region is a face region of a main subject, the estimating performs edge extraction on the image and thereafter perform mask processing in which a signal in a skin color region becomes valid.

* * * * *